United States Patent
Vankayala et al.

(10) Patent No.: US 12,289,620 B2
(45) Date of Patent: Apr. 29, 2025

(54) METHOD AND DEVICE OF ENABLING MULTI-CONNECTIVITY IN WIRELESS NETWORK FOR IMPROVING QOS OF UE

(71) Applicant: Samsung Electronics Co., Ltd., Suwon-si (KR)

(72) Inventors: Satya Kumar Vankayala, Guntur (IN); Ashvin Kaithara Joseph, Sarjapura Hobli (IN); Seungil Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 411 days.

(21) Appl. No.: 17/871,442

(22) Filed: Jul. 22, 2022

(65) Prior Publication Data
US 2023/0015038 A1   Jan. 19, 2023

Related U.S. Application Data

(63) Continuation of application No. PCT/KR2022/009468, filed on Jun. 30, 2022.

(30) Foreign Application Priority Data

Jul. 13, 2021   (IN) ............................. 202141031492
Apr. 8, 2022   (IN) ............................ 2021 41031492

(51) Int. Cl.
*H04W 24/02* (2009.01)
*H04L 41/147* (2022.01)
(Continued)

(52) U.S. Cl.
CPC ........... *H04W 24/02* (2013.01); *H04L 41/147* (2013.01); *H04W 24/08* (2013.01); *H04W 36/00692* (2023.05)

(58) Field of Classification Search
CPC .... H04L 41/147; H04W 24/02; H04W 24/08; H04W 36/00692; H04W 36/305; H04W 76/15; H04W 76/19
See application file for complete search history.

(56) References Cited

U.S. PATENT DOCUMENTS 9,763,151 B2   9/2017   Kim
9,794,839 B2   10/2017   Lin et al.
(Continued)

FOREIGN PATENT DOCUMENTS

CA   2898564 A1 *   7/2014   ........ H04W 36/0055
CN   105122863 A   12/2015
(Continued)

OTHER PUBLICATIONS ip.com*
(Continued)

*Primary Examiner* — Phuc H Tran
(74) *Attorney, Agent, or Firm* — Jefferson IP Law, LLP (57) ABSTRACT

A method of enabling multi-connectivity in a wireless network includes predicting at least one of a RLF, a call drop, and a jitter based on a plurality of Key Performance Indicators (KPIs) associated with the UE and the wireless network, determining whether the UE is in one of a Dual Connectivity (DC) mode and a carrier aggregation (CA) mode, performing one of: adding a new secondary gNodeB (gNB) in response to determining that the UE is not in both the DC mode and the CA mode and converting the new gNB to a master gNB, converting an existing secondary gNodeB to a master gNodeB with one of an existing Master Cell Group (MCG) gNodeB and another gNodeB as the secondary gNodeB, in response to determining that the UE is in the DC mode, and converting an existing secondary cell to a primary cell.

18 Claims, 7 Drawing Sheets

(51) Int. Cl.
*H04W 24/08* (2009.01)
*H04W 36/00* (2009.01)

(56) References Cited

U.S. PATENT DOCUMENTS

| | | |
|---|---|---|
| 9,894,702 B2 | 2/2018 | Mishra et al. |
| 10,582,560 B2 | 3/2020 | Park et al. |
| 10,873,952 B2 * | 12/2020 | Wang ................ H04W 76/15 |
| 10,959,279 B2 | 3/2021 | Orsino et al. |
| 10,986,634 B1 * | 4/2021 | Liu ................ H04W 72/543 |
| 2015/0131537 A1 * | 5/2015 | Chiang ............. H04L 5/0057 370/329 |
| 2018/0352491 A1 | 12/2018 | Shih et al. |
| 2020/0022202 A1 | 1/2020 | Guha et al. |
| 2020/0413470 A1 | 12/2020 | Yang |
| 2022/0345957 A1 | 10/2022 | Rugeland et al. |
| 2022/0369181 A1 | 11/2022 | Selvaganapathy et al. |

FOREIGN PATENT DOCUMENTS

| | | | |
|---|---|---|---|
| CN | 109510697 B | 7/2021 | |
| DE | 102020204028 A1 * | 10/2020 | ............. H04L 5/001 |
| EP | 3 780 878 B1 | 4/2023 | |
| JP | 2021-061639 A | 4/2021 | |
| WO | WO-2014111499 A1 * | 7/2014 | ........ H04W 36/0055 |
| WO | 2020/234902 A1 | 11/2020 | |
| WO | 2021/070119 A1 | 4/2021 | |
| WO | WO-2021089684 A1 * | 5/2021 | ........ H04W 36/0069 |

OTHER PUBLICATIONS

International Search Report and Written Opinion dated Sep. 30, 2022, issued in International Application No. PCT/KR2022/009468.
Indian Office Action dated Mar. 6, 2023, issued in Indian Application No. 202141031492.
Indian Office Action dated Sep. 13, 2024, issued in Indian Patent Application No. 202141031492.

* cited by examiner

METHOD AND DEVICE OF ENABLING MULTI-CONNECTIVITY IN WIRELESS NETWORK FOR IMPROVING QOS OF UE

CROSS-REFERENCE TO RELATED APPLICATION(S)

This application is a continuation application, claiming priority under § 365(c), of an International application No. PCT/KR2022/009468, filed on Jun. 30, 2022, which is based on and claims the benefit of an Indian provisional patent application number 202141031492, filed on Jul. 13, 2021, in the Indian Patent Office, and of an Indian Complete patent application number 202141031492, filed on Apr. 8, 2022, in the Indian Patent Office, the disclosure of each of which is incorporated by reference herein in its entirety.

FIELD OF INVENTION

The disclosure relates to multi/dual-connectivity. More particularly, the disclosure relates to a method and device to improve a Radio Link Failure (RLF) for 5th Generation/6$^{th}$ Generation (5G/6G) Virtualized Radio Access Network/Open Radio Access Network/Centralized Radio Access Network (VRAN/ORAN/CRAN) systems.

BACKGROUND

A network may transfer (hand over), a user connection from a current cell to another cell, so that a user terminal will experience higher signal strength. This process is called a handover and an interruption in the handover causes a Radio Link Failure (RLF).

5G and/or 6G services demands stringent hard deadline, uninterrupted service and low packet loss tolerance. At higher frequency, coverage area holes are more due to high diffraction/refractions in the 5G and 6G architecture. For critical services such as Ultra Reliability and Low Latency Communications (URLLC), Vehicle to Vehicle (V2V), Vehicle to Everything (V2X) and the like, avoiding and reducing Jitters, RLF, call drops is a major concern.

Thus, it is important to minimize the jitters, the RLF, the call drops in cellular networks for a better user experience. Deteriorating signal strength is one of the key indicators investigated in determining the RLF. With millimetre wave (mmW) frequencies, the problem of RLF is more prominent. This is because the high frequencies do not penetrate surfaces easily making it prone to link failures.

Rel-15 in the 3GPP specification discloses several Dual Connectivity (DC) options including New Radio (NR) access. In the DC, the user equipment (UE) is connected simultaneously to a Master Node (MN) and a Secondary Node (SN). By utilizing Secondary Cell Group (SCG) connectivity, the interruption time caused by a Master Cell Group (MCG) RLF can be reduced from several seconds down to a typical handover interruption time of 30-70 ms. For end users, this directly translates into decreased service interruption times.

Therefore, there is a need to reduce the jitters for the users in the VRAN/ORAN/CRAN systems to improve a Quality of the Experience (QoE) of the UE, thereby reducing an overall number of call drops.

The above information is presented as background information only to assist with an understanding of the disclosure. No determination has been made, and no assertion is made, as to whether any of the above might be applicable as prior art with regard to the disclosure.

OBJECT OF INVENTION

Aspects of the disclosure are to address at least the above-mentioned problems and/or disadvantages and to provide at least the advantages described below. Accordingly, an aspect of the disclosure is to provide a method to enable multi/dual-connectivity to improve Radio Link Failure (RLF) for 5G/6G Virtualized radio access network/Open radio access network (VRAN/ORAN) systems.

The embodiments herein further aim in reducing the jitters for users in the VRAN/ORAN/CRAN systems and improving a user Quality of the Experience (QoE).

Another aspect of the disclosure is to reduce an overall number of call drops in the system.

Additional aspects will be set forth in part in the description which follows and, in part, will be apparent from the description, or may be learned by practice of the presented embodiments.

SUMMARY

In accordance with an aspect of the disclosure, a method of enabling multi-connectivity in a wireless network for improving Quality of Service for a UE is provided. The method includes predicting, by a network entity, at least one of a Radio Link Failure (RLF), a call drop, and a jitter based on a plurality of Key Performance Indicators (KPIs) associated with the UE and the wireless network, determining, by the network entity, whether the UE is in one of a Dual Connectivity (DC) mode and a Carrier Aggregation (CA) mode, performing, by the network entity one of: adding a new secondary gNodeB (gNB) in response to determining that the UE is not in both the DC mode and the CA mode and converting the new gNB to a master gNB, converting an existing secondary gNodeB to a master gNodeB with one of an existing Master Cell Group (MCG) gNodeB and another gNodeB as the secondary gNodeB, in response to determining that the UE is in the DC mode, and converting an existing secondary cell to a primary cell in response to determining that UE is in CA mode, and enabling, by the network entity, the multi-connectivity in the wireless network to avoid at least one of the RLF, the call drop and the jitter in one of the CA mode and the DC mode.

In an embodiment, the multi-connectivity is enabled in the wireless network using one of the new gNB being converted to the master gNB in the DC mode, or the new gNB being converted to the master gNB in the CA mode, or an existing secondary gNB being converted to the master gNB in the DC mode, and the existing secondary cell being converted to the primary cell in the CA mode.

In another embodiment, the predicting of the at least one of the Radio Link Failure (RLF), the call drop and the jitter comprises reporting, by the UE, a Channel State Information (CSI) to the network entity, inputting, by the UE 100, the CSI and the plurality of Key Performance Indicators (KPIs) associated with the UE and the wireless network to a Machine learning (ML) model, and predicting, by the ML model, at least one of the Radio Link Failure (RLF), the call drop and the jitter based on a plurality of Key Performance Indicators (KPIs) associated with the UE and the wireless network.

In an embodiment, the ML model corresponds to a Neural Network (NN) which further determines whether the UE needs one of the DC mode, and the CA mode.

In another embodiment, the plurality of KPIs associated with the UE (100) and the wireless system comprises a Quality Indicator (CQI), measurements of an MCG data bearers, a pre-coding matrix index, and a Received Signal Strength Indicator (RSSI) measurement.

In an embodiment, the network entity is one of the gNB, an Open-Radio Access Network (O-RAN), and a Virtual Assisted Network (V-RAN).

In accordance with another aspect of the disclosure, a method of enabling multi-connectivity in a wireless system for improving Quality of Service for a User Equipment (UE) in a Dual Connectivity (DC) mode is provided. The method includes detecting, by the UE, at least one of a Radio Link Failure (RLF), a call drop, and a jitter based on a plurality of Key Performance Indicators (KPIs) associated with the UE and the wireless network, and performing, by the UE, a Master Node to a Secondary Node reconfiguration for the UE to avoid the RLF.

In an embodiment, the plurality of KPIs associated with the UE 100 and the wireless system comprises a Quality Indicator (CQI), measurements of an MCG data bearers, a precoding matrix index, and a Received Signal Strength Indicator (RSSI) measurement.

In accordance with another aspect of the disclosure, a system of enabling multi-connectivity in a wireless network for improving Quality of Service for a UE is provided. The system includes a network entity, the UE, and a Dual-connectivity Neural Network (DCNN). The network entity is configured to predict at least one of a Radio Link Failure (RLF), a call drop and a jitter based on a plurality of Key Performance Indicators (KPIs) associated with the UE 100 and the wireless network, determine whether the UE is in one of a Dual Connectivity (DC) mode and a Carrier Aggregation (CA) mode, perform one of: adding a new secondary gNB in response to determining that the UE is not in both the DC mode and the CA mode and converting the new gNB to a master gNB, converting an existing secondary gNodeB to a master gNodeB with one of an existing Master Cell Group (MCG) gNodeB and another gNodeB as the secondary gNodeB, in response to determining that the UE is in the DC mode, and converting an existing secondary cell to a primary cell in response to determining that UE is in CA mode, and enable the multi-connectivity in the wireless network to avoid at least one of the RLF, the call drop, and the jitter in one of the CA mode and the DC mode.

In accordance with another aspect of the disclosure, a User Equipment (UE) for enabling multi-connectivity in a wireless system for improving Quality of Service in a Dual Connectivity (DC) mode is provided. The UE includes a memory, a processor, a communicator and a multi-connectivity enabler. The multi-connectivity enabler is configured to detect a network connectivity error comprising at least one of a Radio Link Failure (RLF), a call drop, and a jitter based on a plurality of Key Performance Indicators (KPIs) associated with the UE and the wireless network, and perform a Master Node to a Secondary Node reconfiguration for the UE to avoid the RLF.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF FIGURES

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION OF INVENTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As is traditional in the field, embodiments may be described and illustrated in terms of blocks which carry out a described function or functions. These blocks, which may be referred to herein as managers, units, controllers, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, the embodiments herein disclose a method of enabling multi-connectivity in a wireless network for improving Quality of Service for a UE, the method comprising: predicting, by a network entity, at least one of a Radio Link Failure (RLF), a call drop and a jitter based on a plurality of Key Performance Indicators (KPIs) associated with the UE and the wireless network; determining, by the network entity, whether the UE is in one of a Dual Connectivity (DC) mode and a Carrier Aggregation (CA) mode; performing, by the network entity one of: adding a new secondary gNB in response to determining that the UE is not in both the DC mode and the CA mode and converting the new gNB to a master gNB, converting an existing secondary gNodeB to a master gNodeB with one of an existing Master Cell Group (MCG) gNodeB and other gNodeB as the secondary gNodeB, in response to determining that the UE is in the DC mode, and converting an existing secondary cell to a primary cell in response to determining that UE is in CA mode; and enabling, by the network entity, the multi-connectivity in the wireless network to avoid at least one of the RLF, the call drop and the jitter in one of the CA mode and the DC mode. In the disclosure, the network entity may also be referred to a network device. The network entity or the network device referred in the disclosure may include a plurality of network entities or the network devices.

Referring now to the drawings and more particularly to FIGS. 1 to 6 where similar reference characters denote corresponding features consistently throughout the figures, there are shown preferred embodiments.

Figure 1:
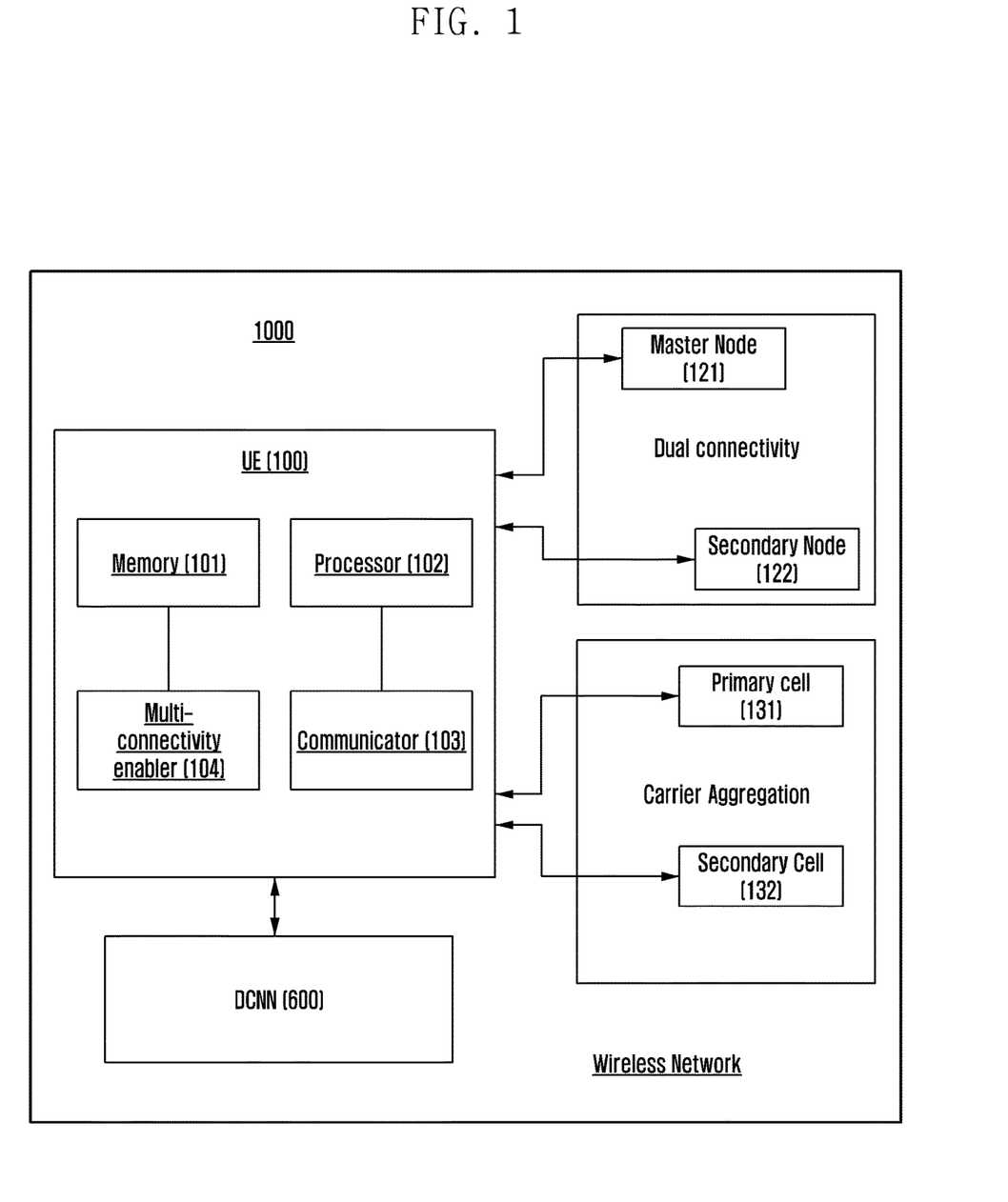
FIG. 1 is a system diagram of a wireless network comprising a UE for enabling multi-connectivity to avoid RLF, according to an embodiment of the disclosure.

FIG. 1 is a system diagram 1000 of a wireless network comprising a UE (100) for enabling multi-connectivity to avoid RLF, according to an embodiment of the disclosure.

Referring to FIG. 1, the UE 100 may be but is not limited, to a mobile device, a cellular phone, a smartphone, a Personal Digital Assistant (PDA), a tablet computer, a laptop computer, an Internet of things (IoT) device, an Artificial Intelligent (AI) device or the like.

The UE 100 includes a memory 101, a processor 102, a communicator 103, and a multi-connectivity enabler 104.

The memory 101 stores instructions to be executed by the processor 102 for enabling multi-connectivity in the UE 100. The memory 101 storage elements may include magnetic hard discs, optical discs, floppy discs, flash memories, or forms of electrically programmable memories (EPROM) or electrically erasable and programmable (EEPROM) memories.

In addition, the memory 101 may, in some examples, be considered a non-transitory storage medium. The term "non-transitory" may indicate that the storage medium is not embodied in a carrier wave or a propagated signal. However, the term "non-transitory" should not be interpreted that the memory 101 is non-movable. In some examples, the memory 101 can be configured to store larger amounts of information. In certain examples, a non-transitory storage medium may store data that can, over time, change (e.g., in Random Access Memory (RAM) or cache). The memory 101 can be an internal storage or can be an external storage unit of the electronic device 100, a cloud storage, or any other type of external storage.

The processor 102 communicates with the memory 101, the communicator 103 and the multi-connectivity enabler 104. The processor 102 is configured to execute instructions stored in the memory 101 for enabling multi-connectivity to avoid the jitters/RLFs/. The processor 102 may include one or a plurality of processors, may be a general purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator 103 is configured to communicate internally between internal hardware components and external devices via one or more networks. The communicator 103 includes an electronic circuit specific to a standard that enables wired or wireless communication.

The multi-connectivity enabler 104 enables the multi-connectivity in the UE (100) to avoid the jitters/RLF/call drops by communicating with a Dual-connectivity Neural Network (DCNN) 600.

The UE 100 may communicate with a gNodeB (gNB). The UE 100 may be in a Dual-Connectivity (DC) mode or a Carrier Aggregated (CA) mode.

The CA mode is a form of Long Term Evolution technology that enables the UE 100 and the wireless network to use more than one carrier frequency.

When the UE 100 is in the DC mode, the UE 100 may be connected to a master node 121 and a secondary node 122.

When the UE 100 is in the CA mode, the UE 100 may be connected to a primary cell (Pcell) 131 and a secondary cell Scell 132.

The PCell is the main cell with which the UE 100 communicates and with which RRC signalling messages are exchanged. One PCell is always active in an RRC_CONNECTED mode while one or more Scells may be active. Additional SCells can only be configured after connection establishment, in a connected mode, to provide additional radio resource.

All PCells and SCells are known collectively as serving cells. The component carriers on which the PCell and Scell are based are the primary component carrier (PCC) and secondary component carrier (SCC), respectively.

In the DC mode, the UE 100 may be connected simultaneously to the Master Node (MN) 121 and the Secondary Node (SN) 122.

The UE 100 may experience jitters/Radio link Failure/call drops due to various conditions. The proposed method discloses different method for enabling multi-connectivity in the UE 100 to avoid the jitters/RLF/call drops.

The UE 100 reports a Channel State Information (CSI) and measurement information to the gNB in the wireless network. According to another embodiment of the disclosure, the UE (100) sends the CSI and the measurement information to a Virtualized Radio Access Network (V-RAN) or an Open Radio Access Network (O-RAN). The measurement information to the gNB can include but not limited to A1, A2, A3, A6, B1, B1-NR, B2, b2-nr, C1, C2, W1, W2, W2, V1, V2, H1, H2 etc. In 5G/6G communication technology, the scope of the measurement information may be further expanded to include new measurements as well.

The UE 100 may send the CSI measurement periodically or on demand.

Further, the gNB sends the CSI measurement information and the measurement information to the ML model (DCNN) 600. The ML model determines whether the UE 100 needs the dual/multi-connectivity.

The ML model determines the jitters, the RLF and the call drops faced by the UE 100 and determines the need of enabling the dual connectivity.

Variables (KPIs) used in the ML model are a channel quality indicator, a rank of the channel, a location of the UE, enable dual connectivity, a category of the UE and measurement vectors. All the variable thresholds in the ML model are set as zero such as (CQI_threshold=0, Rank_threshold=0, Location_of_UE=null, enable_dual_connectivity=0, UE_category=0, measurements_vector=0).

When the channel conditions and the plurality of KPIs deteriorate, the ML model conveys two probabilities P1 and P2. The probability P1 indicates enabling dual-connectivity when not enabled, whereas the probability P2 indicates swapping the MCG and the SCG, when the dual-connectivity is already enabled.

A reward function in the ML model is updated as a function of the location of the UE 100 and the KPIs.

Further, weights in the ML modes are also updated based on the reward function and the steps are repeated till a ML learning process is converged.

The operations of the ML model are repeated periodically or on demand basis when x % jitters/RLF/call drops incidents are happening, where "x" is an operator decided threshold parameter.

If the dual-connectivity/CA is not enabled and the ML model determines that there is a need to enable the dual-connectivity for the UE 100 due to the jitters/RLF/call drops, the gNB/VRAN/ORAN will intelligently add a new Secondary gNodeB (secondary cell for CA), enable the dual connectivity/CA with a new secondary gNodeB (new Pcell) and convert the new gNodeB to a Master gNodeB to avoid the jitters/RLF/call drops.

In another embodiment, the ML models may predict the RLF/jitters/call drop scenario before the jitters/RLF/call drops are going to actually happen based on the past experience with the UE 100.

Based on the prediction, the gNB enables the dual-connectivity/CA with a new secondary node and convert the new node to avoid the jitters/RLF/call drops, when the UE 100 is not in the dual-connectivity/CA mode.

Thus, as seen above the UE 100 latches on to a new node based on the prediction by the ML mode, to avoid jitters/RLFs/call drops.

Although FIG. 1 shows various hardware components of the UE 100, it is to be understood that other embodiments are not limited thereon. In other embodiments of the disclosure, the UE 100 the different components. Further, the labels or names of the components are used only for illustrative purpose and does not limit the scope of the disclosure. One or more components can be combined together to perform same or substantially similar function to enabling multi-connectivity for avoiding jitters/call drops/RLFs.

Figure 2:
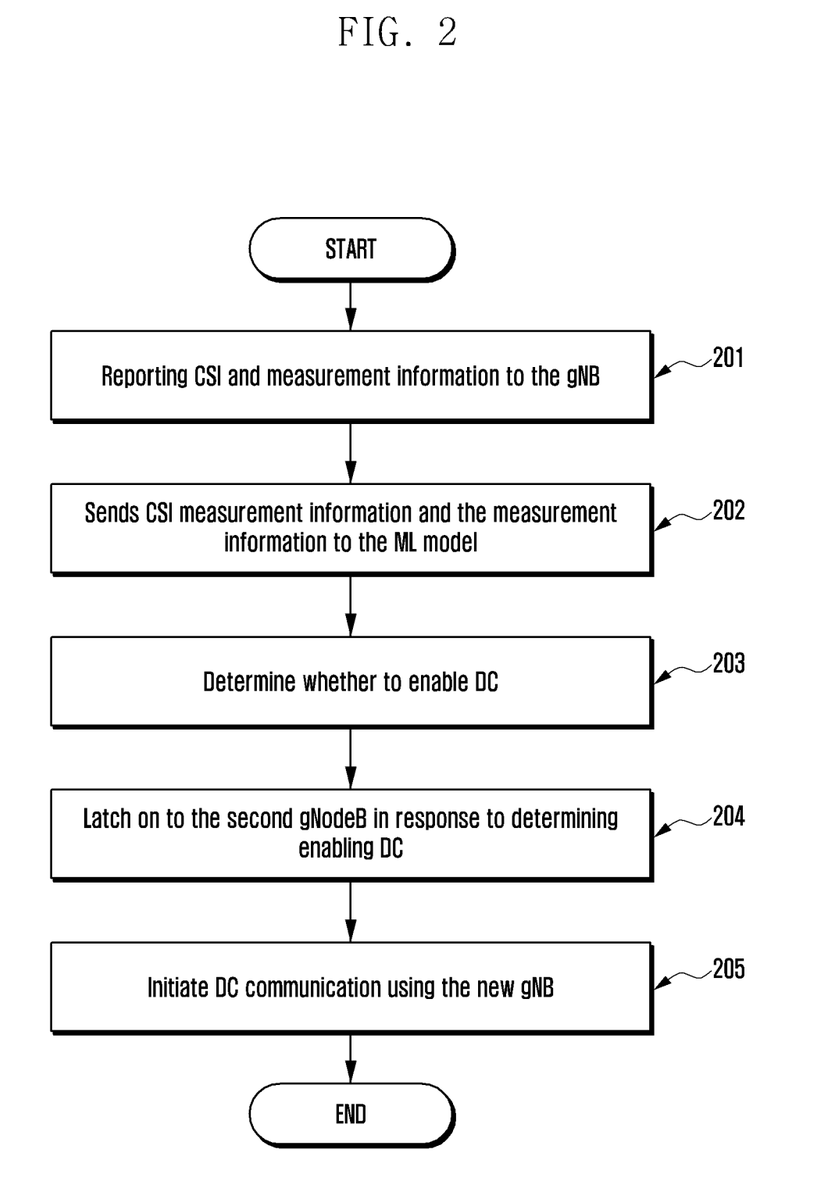
FIG. 2 is a flow diagram for enabling the UE for dual connectivity, according to an embodiment of the disclosure.

FIG. 2 is a flow diagram of enabling a UE 100 for dual connectivity, according to an embodiment of the disclosure.

Referring to FIG. 2, a network initiated solution for enabling the multi-connectivity in the UE 100 is illustrated. At operation 201, the UE 100 reports Channel State Information (CSI) and measurement information to the gNB in the wireless network. According to another embodiment, the UE 100 sends the CSI and the measurement information to a Virtualised Radio Access Network (V-RAN) or an Open Radio Access Network (O-RAN). The CSI information provides details regarding a channel quality, Rank, PI etc.

The UE 100 may send the CSI measurement periodically or on demand.

At operation 202, the gNB sends the CSI measurement information and the measurement information to the ML model. The ML model determines whether the UE 100 needs the dual/multi-connectivity.

The ML model determines the jitters, the RLF and the call drops faced by the UE 100 and determines the need of enabling the dual connectivity.

Variables (KPIs) used in the ML model are a channel quality indicator, a rank of the channel, a location of the UE, enable dual connectivity, a category of the UE and measurement vectors. All the variable thresholds in the ML model are set as zero such as (CQI_threshold=0, Rank_threshold=0, Location_of_UE=null, enable_dual_connectivity=0, UE_category=0, measurements_vector=0).

When the channel conditions and the plurality of KPIs deteriorate, the ML model conveys two probabilities P1 and P2. The probability P1 indicates enabling dual-connectivity when not enabled, whereas the probability P2 indicates swapping the MCG and the SCG, when the dual-connectivity is already enabled.

A reward function in the ML model is updates as a function of the location of the UE 100 and the KPIs.

Further, weights in the ML modes are also updated based on the reward function and the steps are repeated till a ML learning process is converged.

The operation of the ML model are repeated periodically or on demand when x % jitters/RLF/call drops incidents are happening, where "x" is an operator decided threshold parameter.

If the dual-connectivity is not enabled and the ML model determines that there is a need to enable the dual-connectivity for the UE 100 due to the jitters/RLF/call drops, the gNB/VRAN/ORAN will intelligently add a new Secondary gNodeB and enable the dual connectivity with a new secondary gNodeB and convert the new gNodeB to a Master gNodeB to avoid the jitters/RLF/call drops at operation 203.

In another embodiment, the ML models predicts the RLF/jitters/call drop scenario before the jitters/RLF/call drops are going to actually happen based on the past experience with the UE (100) at operation 203.

Based on the prediction, the gNB enables the dual-connectivity with a new secondary gNodeB and convert the new gNodeB to gNodeB to avoid the jitters/RLF/call drops, when the UE 100 is not in the dual-connectivity mode at operation 203.

At operation 204, the UE 100 latches on to the second gNodeB and starts Dual connectivity communication at operation 205.

Thus, as seen above, the dual-connectivity is enabled to avoid the jitters/RLF/call drops.

The various actions, acts, blocks, steps, or the like in the flow diagram may be performed in the order presented, in a different order or simultaneously. Further, in some embodiments, some of the actions, acts, blocks, steps, or the like may be omitted, added, modified, skipped, or the like without departing from the scope of the disclosure.

Figure 3:
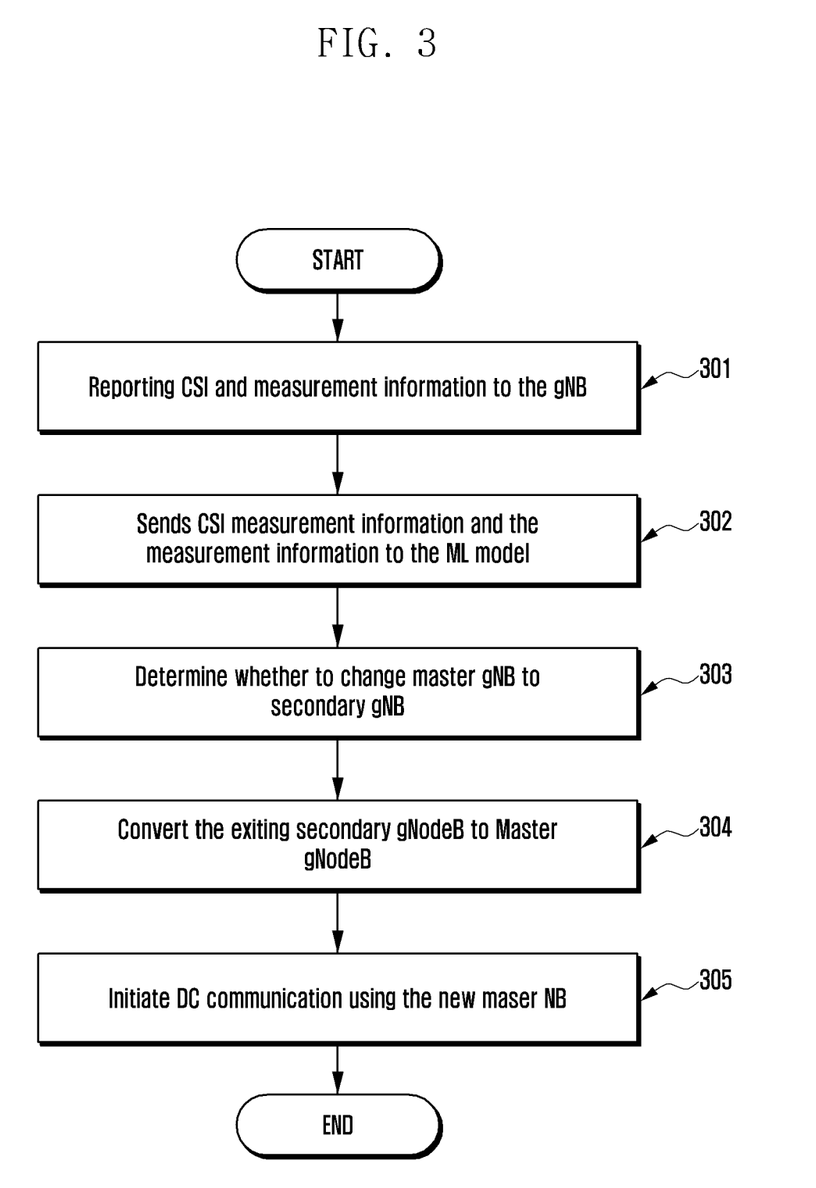
FIG. 3 is a flow diagram for enabling the UE for dual connectivity, when the UE is already in the dual-connectivity mode, according to an embodiment of the disclosure.

FIG. 3 is a flow diagram for enabling the UE 100 for dual connectivity, when the UE 100 is already in the dual-connectivity mode, according to an embodiment of the disclosure.

Referring to FIG. 3 is a network initiated solution for enabling the multi-connectivity in the UE 100 is illustrated. At operation 301, the UE 100 reports a Channel State Information (CSI) and a measurement information to the gNB in the wireless network. According to another embodiment, the UE 100 sends the CSI and the measurement information to a Virtualised Radio Access Network (V-RAN) or an Open Radio Access Network (O-RAN).

The UE 100 may send the CSI measurement periodically or on demand.

At operation 302, the gNB sends the sends the CSI measurement information and the measurement information to the ML model. The ML model determines whether there a need to change the MSG to the SCG and vice versa.

The ML model determines the jitters, the RLF and the call drops faced by the UE 100 and determines the need of enabling the dual connectivity.

Variables (KPIs) used in the ML model are a channel quality indicator, a rank of the channel, a location of the UE, enable dual connectivity, a category of the UE and measurement vectors. All the variable thresholds in the ML model are set as zero such as (CQI_threshold=0, Rank_threshold=0, Location_of_UE=null, enable_dual_connectivity=0, UE_category=0, measurements_vector=0).

When the channel conditions and the plurality of KPIs deteriorate, the ML model compute the optimal primary cell and the secondary cell.

The reward function in the ML model is updates as a function of the location of the UE 100 and the KPIs.

Further, a radio map is updated based on the reward function.

The above operations to be performed by the ML model are repeated until the radio map is prepared.

The operation of the ML model are repeated periodically or on demand when x % jitters/RLF/call drops incidents are happening, where "x" is an operator decided threshold parameter.

Once the ML mode determines whether to swap the SCG and the MSG, the gNB/VRAN/ORAN, accordingly, performs the function.

The gNodeB acts upon the ML model decision immediately and initiate Master Node to Secondary Node reconfiguration procedure. The master gNodeB to Secondary gNodeB and vice versa are performed as per standard procedure in the gNodeB.

In another embodiment, the ML models predicts the RLF/jitters/call drop scenario before the jitters/RLF/call drops are going to actually happen based on the past experience with the UE (100) at operation 303.

Based on the predictions, the gNB intelligently converts the existing secondary gNodeB to Master gNodeB with earlier Master Cell Group (MCG) gNodeB or some other gNodeB as the secondary gNodeB to avoid RLF/jitters/call drops at operation 304.

In another embodied, at operation 304, the user moves to next best cell under the dual-connectivity operation to avoid the jitters/RLF/call drops.

At operation 305, the gNodeB may determine to reconfigure the UE 100 to the secondary node or any other cells within the dual-connectivity operation or even reconfigure to any other cells to avoid the jitters/RLF/call drops.

Thus, as seen above, the dual-connectivity is enabled to avoid the jitters/RLF/call drops.

The various actions, acts, blocks, steps, or the like in the flow diagram may be performed in the order presented, in a different order or simultaneously. Further, in some embodiments, some of the actions, acts, blocks, steps, or the like may be omitted, added, modified, skipped, or the like without departing from the scope of the disclosure.

Figure 4:
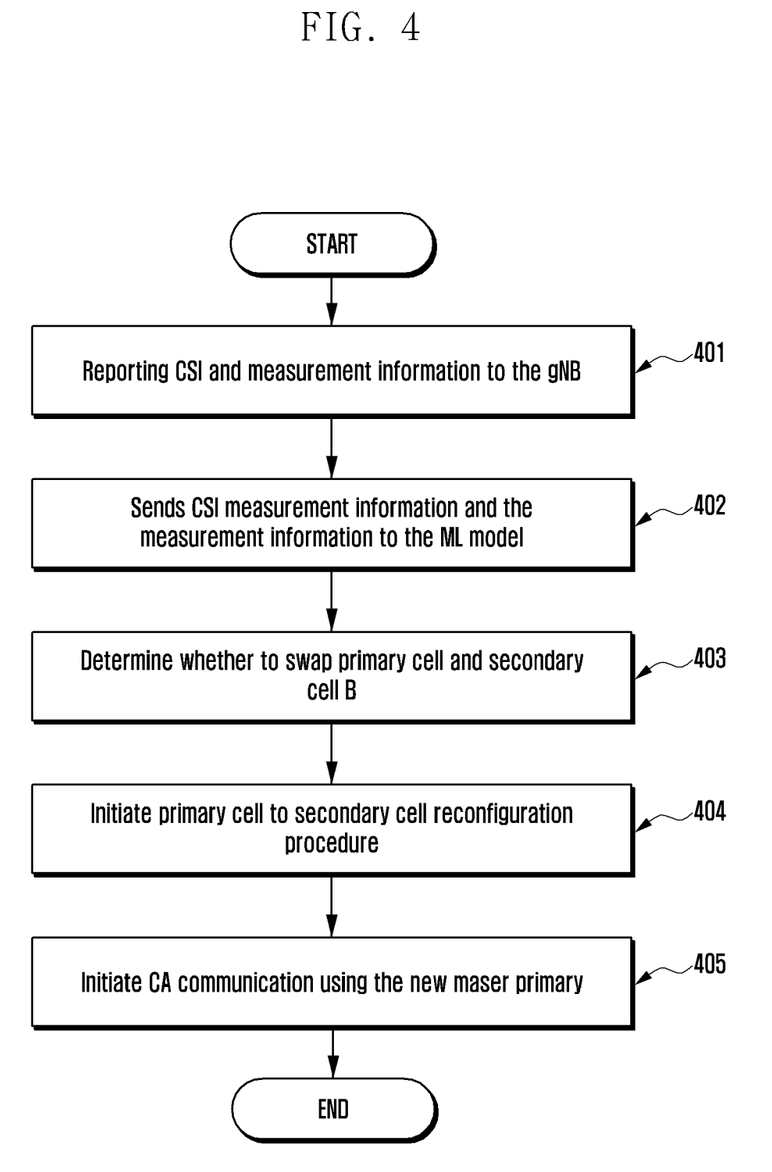
FIG. 4 is a flow diagram of enabling the UE for multi-connectivity, when the UE is in carrier aggregation (CA) mode, according to an embodiment of the disclosure.

FIG. 4 is a flow diagram of enabling a UE 100 for multi-connectivity, when the UE 100 is in carrier aggregation (CA) mode, according to an embodiment of the disclosure.

Referring to FIG. 4, a network initiated solution for enabling the multi-connectivity in the UE 100 is illustrated. At operation 401, the UE 100 reports Channel State Information (CSI) and measurement information to the wireless network for a master gNB 121 and a secondary gNB 122.

The UE 100 may send the CSI measurement periodically or on demand.

At operation 402, the wireless network sends the CSI measurement information and the measurement information to the ML model. The network entity which sends the CSI measurement information is Backend physical layer/MAC with the ML module. The ML model determines whether there a need to change the primary cell to the secondary cell and vice versa.

The ML model determines the jitters, the RLF, and the call drops faced by the UE 100 and determines the need of swapping the primary cell to the secondary cell.

Variables (KPIs) used in the ML model are a channel quality indicator, a rank of the channel, a location of the UE, enable dual connectivity, a category of the UE and measurement vectors. All the variable thresholds in the ML model are set as zero such as (CQI_threshold=0, Rank_threshold=0, Location_of_UE=null, enable_dual_connectivity=0, UE_category=0, measurements_vector=0).

When the channel conditions and the plurality of KPIs deteriorate, the ML model computes the optimal primary cell and the secondary cell. Further, the ML model also determines whether the UE 100 needs carrier aggregation.

The reward function in the ML model is updated as a function of the location of the UE 100 and the KPIs.

Further, the weights of the ML model are updated based on the reward function.

The above steps to be performed by the ML model are repeated until the ML model learning process is saturated.

The method steps of the ML model are repeated periodically or on demand basis when x % jitters/RLF/call drops incidents are happening, where "x" is an operator decided threshold parameter.

Once the ML mode determines to swap the primary cell and the secondary cell at operation 403, the gNB/VRAN/ORAN, accordingly, performs the function.

In an embodiment, the gNodeB act upon the ML model decision immediately and initiate primary cell to secondary cell reconfiguration procedure. The primary cell to secondary cell reconfiguration and vice-versa are performed as per standard procedure in the gNodeB.

In another embodiment, the ML models predicts the RLF/jitters/call drop scenario before the jitters/RLF/call drops are going to actually happen based on the past experience with the UE 100 at operation 403.

Based on the predictions, the gNB intelligently converts the existing secondary cell to the primary Cell to avoid RLF/jitters/call drops at operation 403.

At operation 404, the user moves to a next best cell under the CA mode to avoid the jitters/RLF/call drops.

At operation 405, the gNodeB may determine to reconfigure the UE (100) to the secondary node or any other cells within the CA operation or even reconfigure to any other cells to avoid the jitters/RLF/call drops.

Thus, as seen above, the multi-connectivity is enabled to avoid the jitters/RLF/call drops in CA mode.

The various actions, acts, blocks, steps, or the like in the flow diagram may be performed in the order presented, in a different order or simultaneously. Further, in some embodiments, some of the actions, acts, blocks, steps, or the like may be omitted, added, modified, skipped, or the like without departing from the scope of the disclosure.

Figure 5:
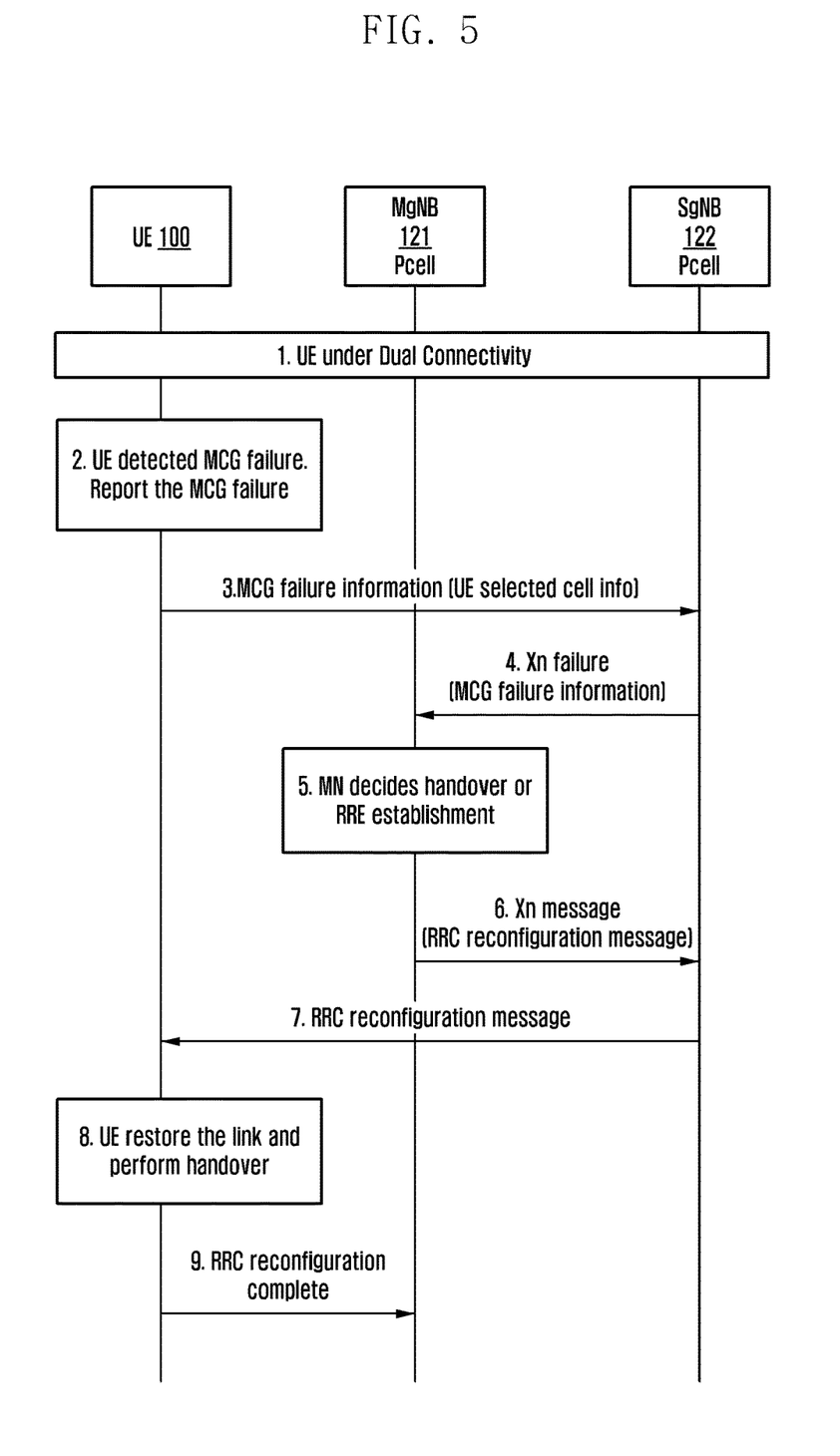
FIG. 5 is a sequence diagram, illustrating a sequence for enabling dual-connectivity by the UE, according to an embodiment of the disclosure.

FIG. 5 is a sequence diagram, illustrating a sequence for enabling dual-connectivity by the UE 100, according to an embodiment of the disclosure.

Referring to FIG. 5, at operation 1, the UE 100 is connected to the master node MgNB 121 and the secondary node SgNB 122 in dual connectivity mode with the MgNB 121 has the control over the UE 100. However, at a point the UE 100 detects that a quality of channel condition associated with the MgNB 121 is reduced and a quality of channel condition associated with the SgNB 122 is higher than that of the MgNB 121. At operation 2, the UE 100 detects the MCG failure. At operation 3, the UE 100 reports the MCG failure to the SgNB 122 by sending MCG failure information (UE selected cell info). At operation 4, the SgNB 122 sends the transaction failure details with the MgNB 121. At operation 5, the MgNB 121 decides to perform a handover or RRE establishment and responds by sending an RRC reconfiguration message to the SgNB 122 (as shown in operation 6). At operation 7, the SgNB 122 sends the RRC reconfiguration message to the UE 100. At operation 8, in response to the RRC reconfiguration message, the UE 100 restores the link and performs the handover and at operation 9, the UE 100 sends the RRC reconfiguration complete message to the MgNB 121.

Therefore, the UE 100 switches to the SPCell and consider as New Pcell and inform the MgNB 121 via SgNB 122 through the SRB3 Message. The MgNB 121 may perform the SPCell Reconfiguration along with MN Link restore.

Figure 6:
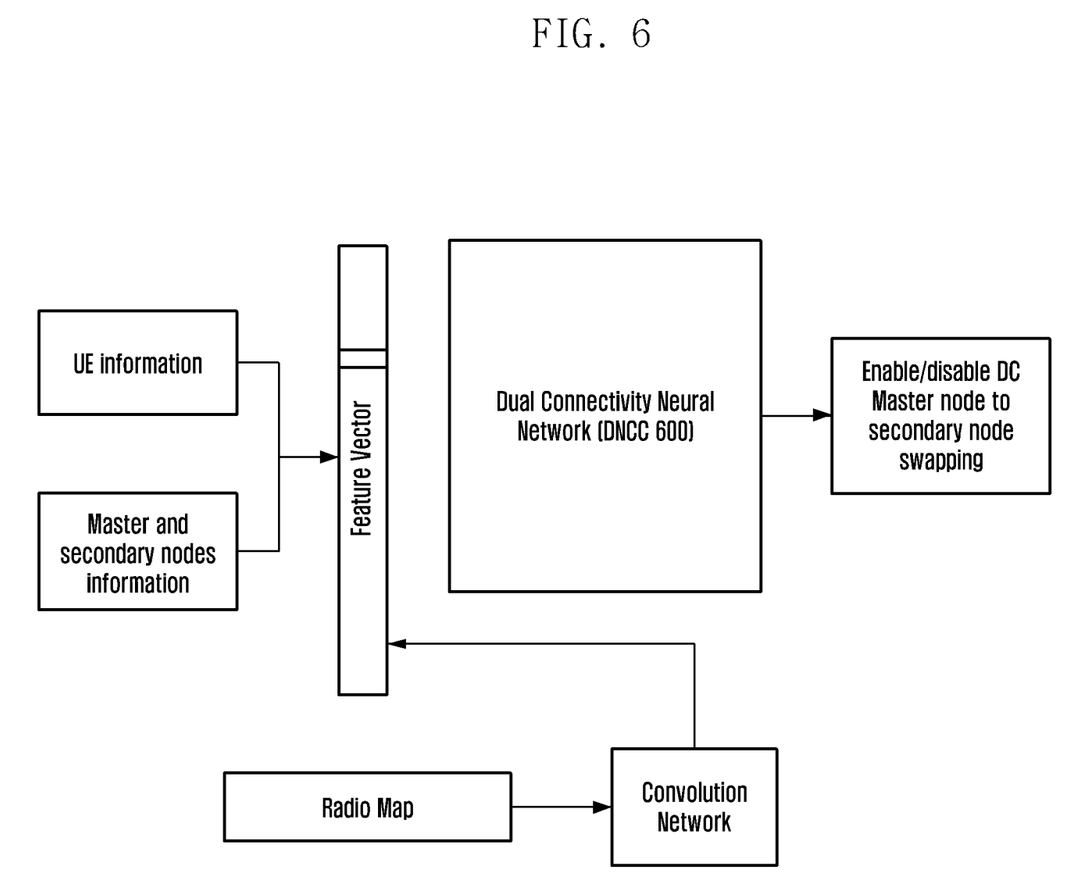
FIG. 6 is a block diagram, illustrating implementation of the ML model, which is a neural network, according to an embodiment of the disclosure.

FIG. 6 is a block diagram, illustrating implementation of the ML model, which is a neural network, according to an embodiment of the disclosure.

Referring to FIG. 6, the UE information and the master and secondary information is fed to a dual connectivity NN (DCNN) 600. Further, the generated radio map is also provided as an input. The radio map keeps a track of a coverage and a throughput for the UE 100.

The input to the DCNN 600 is a vector of size 128. The input vector is composed by concatenating the UE information and the master cell and the secondary cell information which is of size 64 and the feature vector is of size 64. The feature vector has information about the radio map.

The number of layers in the DCNN 600 is six, and a number of nodes in the layers are 256, 512, 256, 128, 64 and 3. An output of the DCNN 600 is a vector of size 3. A neural network (DNN, CNN) is used to predict the viability of dual connectivity for an UE depending upon the KPIs received from the UE, master and neighboring cells.

Figure 7:
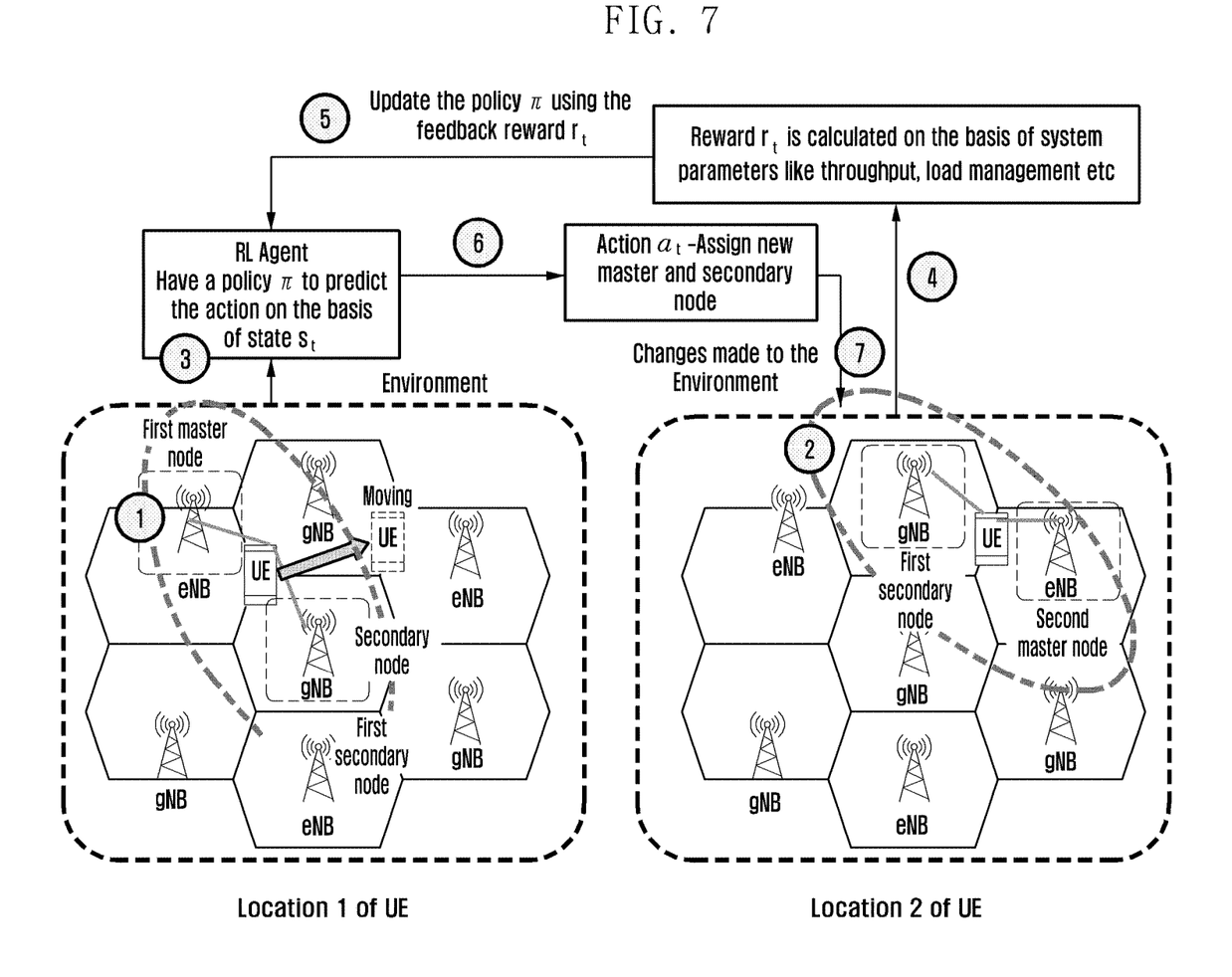
FIG. 7 illustrates a reinforcement learning (RL) flow for enabling of the dual-connectivity by the UE, according to an embodiment of the disclosure.

FIG. 7 illustrates a reinforcement learning (RL) flow for enabling of the dual-connectivity by the UE 100, according to an embodiment of the disclosure.

Referring to FIG. 7, the RL mechanism for performing the handover between the $4^{th}$ generation (4G) and the 5G RATs includes:

1. The RL mechanism performs the handovers between the 4G and the 5G RATs. The proposed method utilizes the strength of DC having lesser amount of handover interruption as compared to conventional hard handover.
2. The proposed method suggests an appropriate handover mechanism between the 4G and the 5G RATs based on application-specific strategy.
3. The proposed method can be utilized by mobile operators, vendors, and researchers to achieve application-specific judgment and select appropriate system parameters and data split strategy to attain the desired QoS.

Referring to FIG. 7, at operation 1 the UE 100 is in location 1 and is in dual connectivity with the first master node and the first secondary node. At operation 2, due to mobility the UE 100 moves to location 2. At operation 3, the change in location of the UE 100 reports a change in state Si to an RL agent. At operation 4, a feedback reward $r_t$ is determined based on various system parameters such as for example but not limited to throughput, load management, and the like.

At operation 5, the RL policy for enabling of the dual-connectivity by the UE 100 is updated based on the feedback reward $r_t$. At operation 6, the RL agent which includes a prediction policy, predicts the actions that needs to be performed based on the change in state Si of the UE 100 and at operation 7, the RL agent assigns a second master node and a second secondary node for the dual connectivity of the UE 100. Here, the RL agent perceives and interpret the environment of the UE 100, takes appropriate actions and learns through trial and error, thereby making the desired changes to the UE environment. Therefore, the proposed method uses RL mechanism to effectively predict appropriate master and secondary nodes for dual connectivity of the UE 100 when the change in state of the UE 100 environment is identified.

Forgoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of enabling multi-connectivity in a wireless network for improving quality of service for a user equipment (UE), the method comprising:
   predicting, by a network device, at least one of a radio link failure (RLF), a call drop, or a jitter based on a plurality of key performance indicators (KPIs) associated with the UE and the wireless network;
   determining, by the network device, whether the UE is in one of a dual connectivity (DC) mode and a carrier aggregation (CA) mode;
   performing, by the network device, one of:
   adding a new secondary gNodeB (gNB) in response to determining that the UE is not in both the DC mode and the CA mode and converting a new gNB to a master gNB, converting an existing secondary gNB to a master gNB with one of an existing master cell group (MCG) gNB and another gNB as a secondary gNB, in response to determining that the UE is in the DC mode, and converting an existing secondary cell to a primary cell in response to determining that UE is in the CA mode; and enabling, by the network device, the multi-connectivity in the wireless network to avoid at least one of the RLF, the call drop, or the jitter in one of the CA mode and the DC mode.

2. The method as claimed in claim 1, wherein the multi-connectivity is enabled in the wireless network using one of:

the new gNB being converted to the master gNB in the DC mode, or the new gNB being converted to the master gNB in the CA mode, or the existing secondary gNB being converted to the master gNB in the DC mode, and the existing secondary cell being converted to the primary cell in the CA mode.

3. The method as claimed in claim 1, wherein the predicting of the at least one of the radio link failure (RLF), the call drop, or the jitter comprises:

reporting, by the UE, a channel state information (CSI) to the network device;

inputting, by the UE, the CSI and the plurality of KPIs associated with the UE and the wireless network to a machine learning (ML) model; and predicting, by the ML model, at least one of the RLF, the call drop, or the jitter based on a plurality of KPIs associated with the UE and the wireless network.

4. The method as claimed in claim 3, wherein the ML model corresponds to a neural network (NN) which further determines whether the UE needs one of the DC mode, and the CA mode.

5. The method as claimed in claim 1, wherein the plurality of KPIs associated with the UE and the wireless network comprises:

a channel quality indicator (CQI),
measurements of an MCG data bearers,
a pre-coding matrix index, and
a received signal strength indicator (RSSI) measurement.

6. The method as claimed in claim 1, wherein the network device is one of the gNB, an open-radio access network (O-RAN), and a virtual assisted network (V-RAN).

7. A method of enabling multi-connectivity in a wireless network for improving quality of service for a user equipment (UE) in a dual connectivity (DC) mode, the method comprising:

detecting, by the UE, at least one of a radio link failure (RLF), a call drop, or a jitter based on a plurality of key performance indicators (KPIs) associated with the UE and the wireless network; and performing, by the UE, a master node to a secondary node reconfiguration for the UE to avoid the RLF, the call drop, or the jitter based on the detecting, wherein the performing of the master node to the secondary node reconfiguration comprises:

transmitting, to a secondary node (SgNB), an MCG failure report; and receiving, from the SgNB, a radio resource control (RRC) message based on the reported MCG failure.

8. The method as claimed in claim 7, wherein the plurality of KPIs associated with the UE and the wireless network comprises:

a channel quality indicator (CQI),
measurements of an MCG data bearers,
a precoding matrix index, and
a received signal strength indicator (RSSI) measurement.

9. A network device of enabling multi-connectivity in a wireless network for improving quality of service for a user equipment (UE), the network device comprising:

memory storing one or more computer programs; and
one or more processors communicatively coupled to the memory, wherein the one or more computer programs include computer-executable instructions that, when executed by the one or more processors individually or collectively, cause the network device to:

predict at least one of a radio link failure (RLF), a call drop, or a jitter based on a plurality of key performance indicators (KPIs) associated with the UE and the wireless network, determine whether the UE is in one of a dual connectivity (DC) mode and a carrier aggregation (CA) mode, perform one of:

add a new secondary gNodeB (gNB) in response to determining that the UE is not in both the DC mode and the CA mode and converting a new gNB to a master gNB, convert an existing secondary gNB to a master gNB with one of an existing master cell group (MCG) gNB and another gNB as the secondary gNB, in response to determining that the UE is in the DC mode, and convert an existing secondary cell to a primary cell in response to determining that UE is in the CA mode, and enable the multi-connectivity in the wireless network to avoid at least one of the RLF, the call drop, or the jitter in one of the CA mode and the DC mode.

10. The network device as claimed in claim 9, wherein the multi-connectivity is enabled in the wireless network using one of:

the new gNB being converted to the master gNB in the DC mode, or the new gNB being converted to the master gNB in the CA mode, or the existing secondary gNB being converted to the master gNB in the DC mode, or the existing secondary cell being converted to the primary cell in the CA mode.

11. The network device as claimed in claim 9, wherein the UE is configured to predict the at least one of the RLF, the call drop, or the jitter by:

reporting a channel state information (CSI) to the network device, inputting the CSI and the plurality of KPIs associated with the UE and the wireless network to a machine learning (ML) model, and predicting, by the ML model, at least one of the RLF, the call drop, or the jitter based on a plurality of KPIs associated with the UE and the wireless network.

12. The network device as claimed in claim 11, wherein the ML model corresponds to a neural network (NN) which further determines whether the UE needs one of the DC mode, and the CA mode.

13. The network device as claimed in claim 9, wherein the plurality of KPIs associated with the UE and the wireless network comprises:

a channel quality indicator (CQI),
measurements of an MCG data bearers, a pre-coding matrix index, and
a received signal strength indicator (RSSI) measurement.

14. The network device as claimed in claim 9, wherein the network device is one of the gNB, an open-radio access network (O-RAN), and a virtual assisted network (V-RAN).

15. A user equipment (UE) for enabling multi-connectivity in a wireless network for improving quality of service in a dual connectivity (DC) mode, the UE comprising:
   memory storing one or more computer programs;
   a communicator;
   a multi-connectivity enabler; and
   one or more processors communicatively coupled to the memory, the communicator, and the multi-connectivity enabler,
   wherein the one or more computer programs include computer-executable instructions that, when executed by the one or more processors individually or collectively, cause the multi-connectivity enabler to:
      detect a network connectivity error comprising at least one of a radio link failure (RLF), a call drop, or a jitter, based on a plurality of key performance indicators (KPIs) associated with the UE and the wireless network, and
      perform a master node to a secondary node reconfiguration for the UE to avoid the RLF, the call drop, or the jitter based on the detection,
   wherein the performance of the master node to the secondary node reconfiguration comprises:
      transmission, to a secondary node (SgNB), of an MCG failure report, and
      reception, from the SgNB, of a radio resource control (RRC) message based on the reported MCG failure.

16. The UE as claimed in claim 15, wherein the plurality of KPIs associated with the UE and the wireless network comprises:
   a channel quality indicator (CQI),
   measurements of a master cell group (MCG) data bearers,
   a precoding matrix index, and
   a received signal strength indicator (RSSI) measurement.

17. The UE as claimed in claim 15, wherein the one or more computer programs further include computer-executable instructions that, when executed by the one or more processors individually or collectively, cause the multi-connectivity enabler to:
   transmit an RRC reconfiguration complete message to a master node (MgNB), after performing the master node to secondary node reconfiguration.

18. The UE as claimed in claim 15, wherein the one or more computer programs further include computer-executable instructions that, when executed by the one or more processors individually or collectively, cause the multi-connectivity enabler to:
   control the communicator to transmit channel state information (CSI) either periodically or in response to a request.

* * * * *